G. W. C. Lovell,
Sad Iron.
No. 100,423. Patented Mar. 1, 1870.
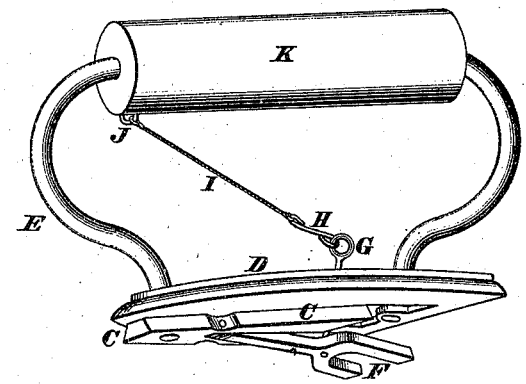
FIG. 1.
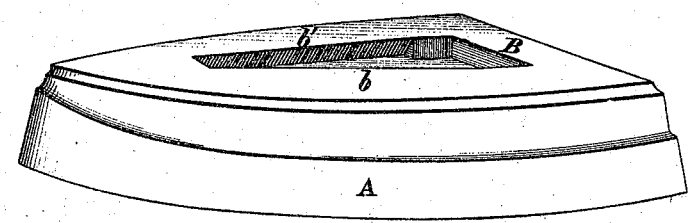
FIG. 2.
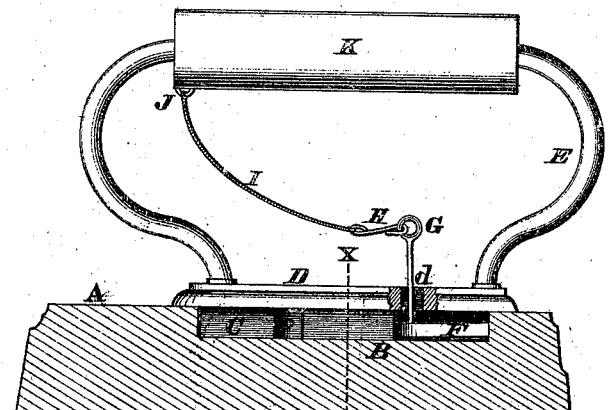
FIG. 4.
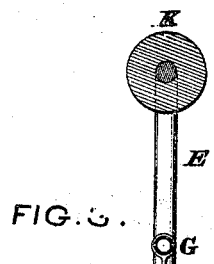
FIG. 3.
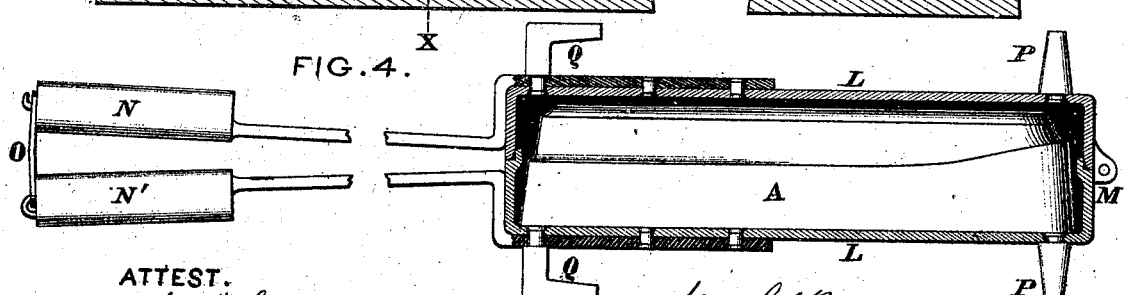
ATTEST.
Jas. H. Layman
George Bousfield
Knight Bros.
Attys of Lovell

United States Patent Office.

GEORGE W. C. LOVELL, OF CLARKSVILLE, TENNESSEE.

Letters Patent No. 100,423, dated March 1, 1870.

IMPROVED SMOOTHING-IRON.

The Schedule referred to in these Letters Patent and making part of the same.

I, GEORGE W. C. LOVELL, of Clarksville, Montgomery county, Tennessee, have invented a new and useful Smoothing-Iron, of which the following is a specification.

Nature and Objects of the Invention.

My invention relates to an improved construction of separable handle smoothing-irons.

General Description with Reference to the Drawings.

Figure 1 is a perspective view of my improved smoothing-iron in its separated condition.

Figure 2 is a longitudinal section of the iron in condition for use.

Figure 3 is a transverse section at the line X X.

Figure 4 is a longitudinal section of the case or shell containing a body or iron proper for heating in a common fire.

This case may be used with my invention, but does not constitute a necessary part thereof.

The body or iron proper A has in its top a recess, B, whose sides, $b$ $b'$, converge toward the point of the iron, and are undercut, as shown, so as to receive and fit a corresponding dovetail, C, that projects from the plate D of the handle E K.

Hinged to the dovetail C is a gravitating dog, F, which, when the said dovetail is pressed forward in its socket B, drops into the position shown in fig. 2, and holds the handle securely to the body of the iron.

The dog F has an eye or staple, G, which protrudes through an orifice, $d$, in the plate D, and is connected by a link, H, and small chain or cord I with an eye, J, in the handle.

The horizontal portion K of the handle may be provided with a wooden or other non-conducting sleeve for the hand of the operator.

Operation.

A smoothing-iron body, A, is placed in the shell L L', and the latter being closed, as shown in fig. 4, is placed into or upon a fire, and when sufficiently heated is taken therefrom, opened, and the handle E so applied as to introduce the dovetail C into the socket B.

The handle, being then pressed forward, the dog F drops by its own weight so that its free end will engage and bind against the rear end of said socket and will securely hold and retain the handle to the body.

Meanwhile, another body may be placed in condition for a similar heating.

When the operator desires to place a body in condition for heating, the handle is readily detached by pressing on the cord I, which act lifts the dog F and at once releases the handle.

The cord I, being a non-conductor, is at all times easily handled, and being insulated from the hotter portions by the link H is not liable to be scorched. A small chain may, however, be used in place of the cord, its disconnuity preserving it from inconvenient heat.

The dog F, depending for effectiveness on simple gravity, is not liable to be disordered by the heat of the iron.

The plate D serves as a screen to protect the hand of the operator from the heat of the iron, and said plate may for that object have a greater lateral extension than here shown, or a special screen may be provided above the body.

Claim.

I claim herein as my invention—

1. The arrangement of recessed iron body A B $b$ $b'$, separable handle E K, dovetail C, and gravitating dog F, substantially as set forth.

2. The combination of the guard D, handle E K, gravitating dog F, staple G, and lifter H I, as and for the purposes set forth.

In testimony of which invention I hereunto set my hand.

G. W. C. LOVELL.

Witnesses:
  GEO. H. KNIGHT,
  JAMES H. LAYMAN.